(12) United States Patent
Markwardt

(10) Patent No.: US 7,387,429 B2
(45) Date of Patent: Jun. 17, 2008

(54) METHOD AND APPARATUS FOR SIMULTANEOUSLY PRODUCING CONFECTIONERIES OF DIFFERENT KINDS

(75) Inventor: Klaus Markwardt, Laatzen (DE)

(73) Assignee: Chocotech GmbH, Wernigerode (DE)

( * ) Notice: Subject to any disclaimer, the term of this patent is extended or adjusted under 35 U.S.C. 154(b) by 459 days.

(21) Appl. No.: 11/245,889

(22) Filed: Oct. 7, 2005

(65) Prior Publication Data

US 2006/0077753 A1 Apr. 13, 2006

(30) Foreign Application Priority Data

Oct. 9, 2004 (DE) ............... 10 2004 049 269

(51) Int. Cl.
*B01F 15/02* (2006.01)
*A23G 3/02* (2006.01)

(52) U.S. Cl. ............ 366/132; 366/134; 366/141; 366/151.1; 426/660

(58) Field of Classification Search ........... 366/131, 366/132, 134, 141, 151.1, 152.1, 160.1, 162.1, 366/189, 348; 426/519, 660; 177/63, 64, 177/65, 66

See application file for complete search history.

(56) References Cited

U.S. PATENT DOCUMENTS

| | | | |
|---|---|---|---|
| 4,544,279 A * | 10/1985 | Rudolph | 366/132 |
| 4,812,047 A * | 3/1989 | Baumann | 366/141 |
| 5,240,324 A * | 8/1993 | Phillips et al. | 366/132 |
| 5,481,968 A | 1/1996 | Clem | |
| 5,484,614 A | 1/1996 | Clem | |
| 6,436,455 B2 * | 8/2002 | Zietlow et al. | 426/104 |

(Continued)

FOREIGN PATENT DOCUMENTS

DE 21 42 158 A 3/1973

(Continued)

OTHER PUBLICATIONS

European Search Report, 3 pages, Feb. 20, 2006.

*Primary Examiner*—Charles E Cooley
(74) *Attorney, Agent, or Firm*—Thomas, Kayden, Horstemeyer & Risley, LLP

(57) ABSTRACT

A method and an apparatus serve for controlling a system for simultaneously producing a plurality of different product kinds of confectioneries in a plurality of product lines. The method includes the steps of dividing a base mass into a plurality of partial masses, the base mass being a common mass for all product kinds and all product lines; mixing the partial masses with different aggregates to produce a plurality of different product masses, the aggregates varying depending on the respective product kind; further processing the product masses as reservoir masses; observing the consumption of the reservoir masses during further processing; refilling the reservoir masses with the respective product mass in response to the result of the observation of the consumption of the reservoir masses, wherein refilling takes place in each of the product lines in batches of product mass, refilling takes place in the product lines at different points in time, and the batches of product masses have approximately identical batch sizes, the batch size of a product masses being the amount of the product mass; and following to a production ending signal, changing the batch sizes and batch times of at least one product mass in a way that the reservoir masses of all product lines are exhausted at the same time.

14 Claims, 5 Drawing Sheets

U.S. PATENT DOCUMENTS 6,685,981 B1 * 2/2004 Lipp .......................... 426/660
6,953,598 B2 * 10/2005 Cotten et al. ............... 426/576
2004/0234675 A1 11/2004 Roy et al.
2006/0077753 A1 * 4/2006 Markwardt ................. 366/132

FOREIGN PATENT DOCUMENTS

| | | |
|---|---|---|
| DE | 102 18 167 | 11/2003 |
| DE | 102 17 984 | 12/2003 |
| EP | 0 648 427 | 4/1995 |
| WO | WO 99/65321 | 12/1999 |
| WO | WO 9963837 A1 * | 12/1999 |
| WO | WO 2004/103085 | 12/2004 |

\* cited by examiner

METHOD AND APPARATUS FOR SIMULTANEOUSLY PRODUCING CONFECTIONERIES OF DIFFERENT KINDS

CROSS REFERENCE TO RELATED APPLICATIONS

This application claims priority to co-pending German Patent Application No. DE 10 2004 049 269.7 entitled "Verfahren und Vorrichtung zur gleichzeitigen Herstellung von Süßwaren in mehreren Produktsorten", filed Oct. 9, 2004.

FIELD OF THE INVENTION

The present invention generally relates to a method and an apparatus for simultaneously producing a plurality of different product kinds in a plurality of product lines. More particularly, the different product kinds are produced by using a common base mass. Especially, the products may be such ones which are produced by pouring a mass, for example jelly products. Especially, such products are packed and sold in mixed packages, bags, boxes and the like which include different product kinds. For example, these different product kinds may have the same shape but different colors. Gummi bears or jelly babies are an example, wherein approximately the same number of products of each color is contained in a package. However, it is also possible to simultaneously produce products of different shapes and/or different tastes. For example, these products may be made available in one common package. The present method and apparatus may also be used for producing other sweets and confectioneries containing gelatin, fondant or other similar masses. The sweets may also be poured into fixed forms without using powder.

BACKGROUND OF THE INVENTION

An apparatus for controlling a system for simultaneously producing sweets of different kinds is generally known in the art. The known apparatus includes a base container for a base mass which is common for all product types. The base mass is produced by weighing the raw materials with a weighing container in a known way. According to the respective recipe, the raw materials are introduced and weighed in the weighing container. Weighing of raw material is conducted in batches. First of all, a batch is transferred into a template container. The mass is continuously removed from the template container by a pump, and it is then transferred through a cooking apparatus and a vacuum chamber such that it may be introduced into the base container as the base mass. The base mass is a mass which usually forms the substantial portion of the product mass and which is used for all kinds of products. The respective product masses are produced from a portion of base mass plus certain aggregates which are product specific. This is realized in a product container which may also be designated as mixing container and weighing container. A respective conduit including a valve serves to transfer the base mass into a respective product container. The aggregates are introduced into the respective product containers in a similar way. For example, this is realized by aggregate containers for aggregates such as flavors, colors and the like. Weighing of the aggregates according to the recipe is realized by weighing containers for the aggregates, the weighing containers being located upstream of the respective product container. A reservoir container is located downstream of each product container. The respective reservoir mass is further processed from the reservoir container. For example, this takes place at a pouring machine. In this case, each reservoir container holds the respective reservoir mass to be processed, and it continuously pours out the mass. During this process, the amount of reservoir mass contained in the reservoir container decreases until a predetermined minimum or an adjustable minimum has been reached. A new batch of product mass is fed into the reservoir container, the volumes of the product container and of the reservoir container being coordinated in a way allowing for transfer of the mass. Transfer of the mass from one container into another container located downstream is realized under the influence of gravity and by opening valves being located in respective conduits. Due to respective weighing in the product container, it is possible to maintain the weights according to the respective recipe. The known system operates in a safe way, and it may be re-adjusted to process different products in a comparatively easy way. The known system automatically adapts to the mass consumption.

Usually, there are no severe difficulties during operation of such known systems during continuous production. The different product masses are mixed according to the recipe. The reservoir containers are refilled with product mass in batches such that adaptation to the throughput is realized. Refilling of the different product masses is shifted timewise during production. This may be caused by the fact that consumers consuming reservoir mass in the different pouring stations of a pouring machine are slightly different and/or that the masses have slightly different properties. A level observing system is arranged in the reservoir containers of the pouring stations. Refilling of the respective reservoir container with product mass is caused by the level observing system.

The product containers and the reservoir containers have different filling levels at the end of simultaneous production of a plurality of product kinds. Some of the product containers contain the same amount of product mass. One or more other product containers have just run empty. A new batch of product mass is just being mixed in one or more other product containers. Similar conditions result from a production interruption or from a change of the recipe. It then needs to be decided to, for example, still consume the present base mass and not to produce new base mass. In the following, this will lead to the product containers being filled and afterwards not being filled anymore which results in different amounts of mass reaching the different reservoir containers from which the mass is further processed. This will finally lead to some product kinds still being produced while other product kinds are no longer produced. When these product kinds as they have been produced are then packed, the ratio of the product kinds in the packages changes in an undesired way. There is the possibility of stopping production as soon as the first reservoir container has been emptied and no refilling of this reservoir container takes place. In this case, the desired ratio of product kinds is maintained, but there are lost masses in the product containers and in the reservoir containers. Such lost masses have to be disposed. This problem always occurs when product masses are mixed in batches. Such mixing in batches may be realized by relating to weight shares or to volume shares. It is not possible to prevent non-uniform consumption of product masses and reservoir masses. Such variations necessarily occur during longer production periods.

A pouring system for confectioneries in which the base mass is volumetrically divided into a product mass after production of a base mass is also generally known in the art.

The aggregates to be added to the base mass are also volumetrically divided by means of glass cylinders. The partial masses are brought together and mixed by opening valves being located in respective connecting conduits and under the influence of gravity. Level sensors are located in the product containers, the level sensors causing the production of a new batch of product mass. There are the same problems as they have been described with respect to the prior art before.

Furthermore, a mixing and dosing system for sweets containing gum or jelly is also generally known in the art. The system includes containers which are interconnected by conduits in which pumps are arranged. Each pouring head and each reservoir container of the pouring machine, respectively, is continuously fed with base mass and aggregates. The number of required pumps located in the conduits is high. Maintenance of the pumps is complicated and the function is unsafe. However, the change to a different product or the termination of a production does not cause problems since conveying by all pumps can be simultaneously interrupted. In this way, this known system does not show the above described problems.

SUMMARY OF THE INVENTION

The present invention relates to a method of controlling a system for simultaneously producing a plurality of different product kinds of confectioneries in a plurality of product lines. The method includes the steps of dividing a base mass into a plurality of partial masses, the base mass being a common mass for all product kinds and all product lines; mixing the partial masses with different aggregates to produce a plurality of different product masses, the aggregates varying depending on the respective product kind; further processing the product masses as reservoir masses; observing the consumption of the reservoir masses during further processing; refilling the reservoir masses with the respective product mass in response to the result of the observation of the consumption of the reservoir masses, wherein refilling takes place in each of the product lines in batches of product mass, refilling takes place in the product lines at different points in time, and the batches of product masses have approximately identical batch sizes, the batch size of a product masses being the amount of the product mass; and following to a production ending signal, changing the batch sizes and batch times of at least one product mass in a way that the reservoir masses of all product lines are exhausted at the same time.

The present invention also relates to an apparatus or a system for simultaneously producing a plurality of different product kinds of confectioneries in a plurality of product lines. The apparatus includes a base container, the base container being designed and arranged to contain a common base mass for all product kinds; a plurality of product containers, each of the product containers being associated with one of the product kinds, the product containers being designed and arranged to produce batches of different product masses in the product lines; a plurality of aggregate containers, each of the aggregate containers being designed and arranged to contain aggregates associated with one of the product lines; a plurality of reservoir containers, each of the reservoir containers being designed and arranged to contain a reservoir mass associated with one of the product lines, each of the reservoir containers being designed and arranged to allow for further processing of the respective reservoir mass, each of the reservoir containers including a sensor, the sensor being designed and arranged to sense a change of the amount of reservoir mass contained in the reservoir container and to produce a signal which is proportional to the change of the amount of reservoir mass contained in the reservoir container; and a common control unit, the common control unit including a processor, the common control unit being designed and arranged to receive the signals of the sensors and to determine and control a modified batch size and batch time of at least one product mass in a way that the reservoir masses of all product lines are exhausted at the same time.

With the novel method and apparatus, it is possible to simultaneously produce a plurality of different product kinds until the ending of production while maintaining a constant mixing ratio of the different products without producing substantial waste. The ending of production is to be understood herein to also include a termination of production of a first kind of products and following production of another kind of different products.

According to the novel method, the amount of reservoir mass contained in each of the plurality of reservoir containers located in each of the plurality of product lines is observed during further processing of the reservoir mass. Observation may be realized by determining one or more filling levels in the reservoir container. During normal production, refilling or back feeding of the reservoir container with a batch of product mass coming from the respective product container is started as soon as the amount of reservoir mass contained in the reservoir container has reached a predetermined minimum.

A batch of mass or in other words a lot of mass is to be understood herein as relating to a certain amount or volume of mass which is contained in a container and which is further processed as a unit "in batches". Accordingly, the batch size is to be understood as indicating the amount or volume of mass, and the batch time is to be understood as indicating the period of time during which the batch is processed within a (repeating) cycle. This means the period of time between the beginning of the process of filling mass into a container and the ending of the process of emptying the container.

Especially, the batch size is kept constant during normal production. The batch size is constructively coordinated with the dimensions of the respective system. In the novel method, the batch sizes and batch times of the product masses following an initiated ending of production (also in the sense of a product change) are changed in a way that the amounts of reservoir masses in all product lines are simultaneously exhausted at a later period of time. Especially, after an initiated ending of production and/or a change of the products, the following batch sizes and batch times of the other product masses compared to a constant product mass having a constant batch time are changed in a way that the amounts of reservoir masses in all product lines are simultaneously exhausted at a later period of time. This effect may be attained by a batch decrease or a batch increase of the remaining batches in all product lines with the exception of the constant master product line. When using the concept of a batch decrease, one initially chooses a first product mass according to which the system is controlled. When using the novel method in the sense of an adaptation by a batch increase, one chooses a last product mass according to which the system is controlled. Each of the product masses may be the first and last product mass, respectively. The mass having the constructively predetermined "normal" batch size is still mixed and processed without changes. The batch sizes of the remaining product masses are changed with respect to the first and last product mass, respectively, in a way that the reservoir amounts of all product masses in each reservoir container are completely consumed ("exhausted") at the same time such that a defined ending of production is reached without producing waste after having fully processed the reservoir masses contained in the reservoir containers. The point in time when a production ending or a change to a different recipe is initiated can be freely chosen, or it may be determined by other events occurring during production. For example, one can terminate production of the base mass and choose the first or last product mass in response thereto. It is preferred to realize the change of the batch sizes by choosing smaller batch sizes of the following product masses. However, it is also possible to increase the batch sizes of the remaining product masses as far as this has been taken into account when constructing the size of the containers. Especially, it is possible to determine the time differences between batch-wise back feeding of the reservoir masses in the product lines with the different product masses of the same amount, and to change the batch sizes and batch times of following product masses of the product lines in response thereto such that the time differences of refilling disappear at a future point in time which is common for all product lines. This will lead to all reservoir containers being filled in the sense of refilling at time differences which decrease over time. This is realized by using different batch sizes such that the reservoir containers are filled in a similar way. In the following, the reservoir masses taken from the reservoir containers are processed. During refill of the last batch of mass, mixing of new mass in the product containers is terminated. Processing of the different reservoir masses contained in the reservoir containers results in reaching one common ending of production without producing waste mass.

The first product mass can be further produced at a changed batch size in case this changed batch size can be coordinated with the batch sizes of the other product masses. However, it is easier to continue producing the first product mass at a constant batch size, meaning not to change the batch size compared to the normal production. The remaining product masses are mixed at reduced batch sizes. It is to be taken into account that the amount of mass to be mixed is sufficient to prevent changes of the properties of the mass caused by the batch size. The reduced batch size of each product mass is chosen to be proportional to the time difference between refill of the respective reservoir mass with the respective product mass and refill of the reservoir mass with the first product mass.

When respectively sizing the reservoir containers and coordinating the sizes of the reservoir containers with respect to one another, it is also possible to reach the ending of production very quickly and to only use one changed batch size of each product mass. However, it is preferred to distribute the changes of the batch size of the other product masses to a plurality of following cycles, especially in a way that the batch size of each following cycle is approximately identical. In this way, it is realized that the differently adapted batch sizes only vary to a small extent such that the masses and products resulting from this process have approximately the same properties as during normal production.

Reduction of the batch sizes of the other product masses preferably occurs according to the following equation:

$$mn = ms - (tn/(ts \cdot c)) \cdot ms$$

wherein the following applies:
ms [kg]=predetermined first batch size of all product masses,
mn [kg]=reduced second batch size of the remaining product masses,
n=product lines (n=1, 2, 3, 4 and so forth),
tn=time difference between refilling with the product masses,
te=0=point in time of refilling with the first product mass,
ts=predetermined batch time all product masses,
c=number of cycles until the production ending.

Accordingly, the batch times for processing the reduced batch sizes of the product masses in the product lines change according to the following equation:

$$tsn = ts \cdot mn/ms$$

wherein:
tsn=reduced batch time of the respective product line.

The product line in which the refilling signal occurs first becomes the guiding line or master line, and it is operated at an unchanged batch size.

Similar conditions apply to an adaptation by a batch increase, i.e.

$$mn = ms + ((tl - tn)/(ts \cdot c)) \cdot ms$$

wherein the following applies:
ms [kg]=predetermined first batch size of all product masses,
mn [kg]=increased second batch size of the remaining product masses,
n=the product lines (n=1, 2, 3, 4 and so forth),
tn=time difference between refilling with the product masses,
tl=time difference between refilling with the last product mass and the first product mass,
ts=predetermined batch time all product masses,
c=number of cycles until the production ending.

The product line in which the refilling signal occurs last becomes the guiding line or master line, and it is operated at an unchanged batch size.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

It is to be noticed that the terminology of the containers and of the mass contained in the respective container as used herein is chosen such that they have a common prefix. For example, "base" mass is contained in the "base" container, "product" mass is contained in the "product" container and so forth.

Figure 1:
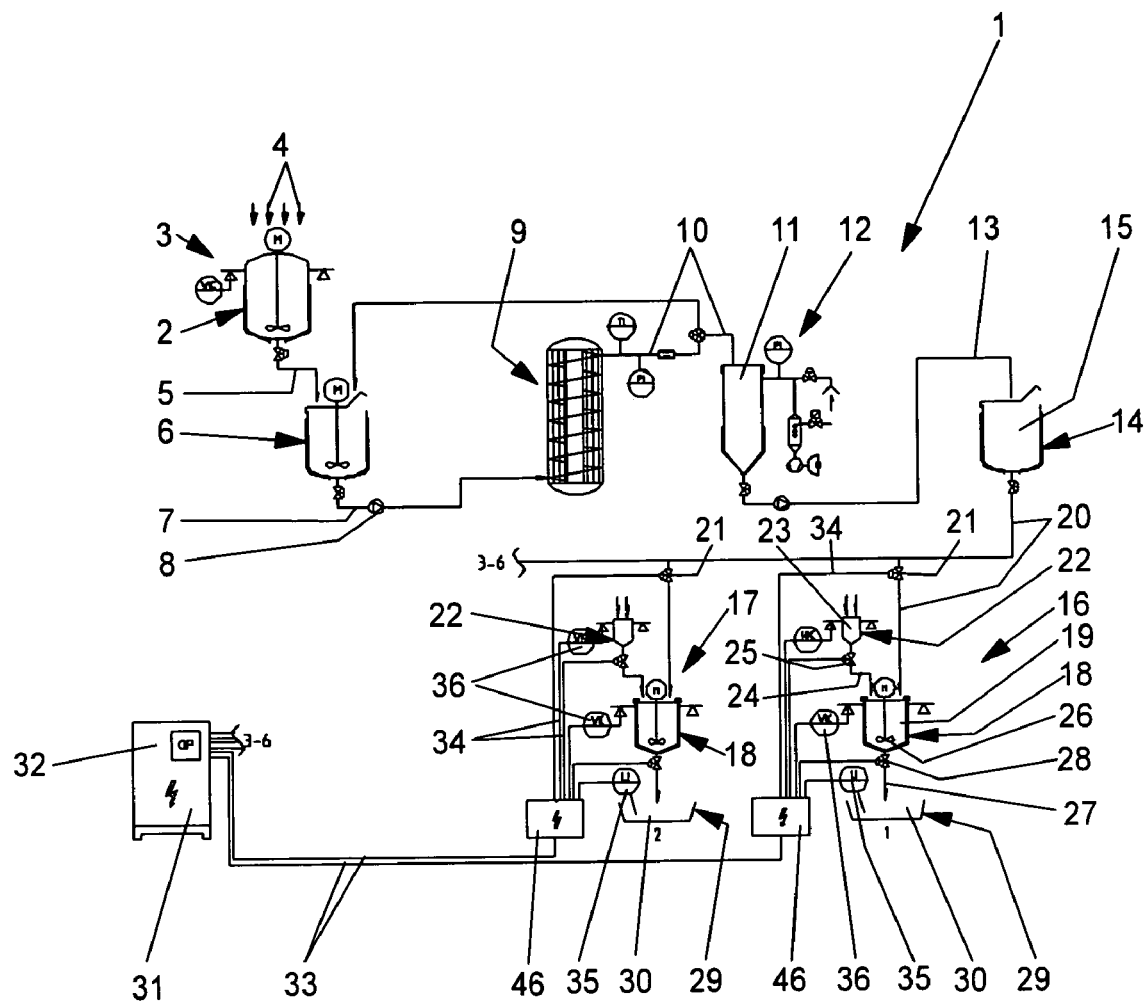
FIG. 1 is a view of a novel system for simultaneously producing a plurality of different product kinds.

FIG. 1 schematically illustrates a first exemplary embodiment of the novel system 1. The system 1 is used to produce a plurality of different product kinds of confectioneries in a plurality of parallel product lines. The system 1 includes a raw material weighing system 3 including a weighing container 2. The raw material or starting material required for producing a base mass 15 is conveyed into the weighing container 2 according to arrows 4. The different kinds of raw materials are introduced into the weighing container 2 according to the recipe of the base material 15. The raw materials are mixed in the weighing container 2. Preferably, the raw materials are mixed in batches. A conduit 5 leads from the weighing container 2 to a template container. A valve is arranged in the conduit 5. The template mass is transferred from the weighing container 2 into the template container 6 in batches. The template container 6 also includes a stirring apparatus to maintain and cause, respectively, homogeneous mixture of the template mass. A conduit 7 leads from the template container 6 to a cooking or boiling apparatus 9. A pump 8 is located in the conduit 7. Preferably, the pump 8 is operated in a continuous way. A conduit 10 leads from the boiling apparatus 9 to a vacuum chamber 11 of a vacuum container 12. The vacuum container 12 is connected to a base container 14 via a conduit 13 including a pump. The base mass 15 is collected in the base container 14. The base mass 15 is a common component or ingredient of the different masses processed downstream in the plurality of product lines. The above described production process of the base mass 15 is to be understood as a non-limiting example. It may be varied in various ways to produce liquid masses.

A plurality of different product lines 16, 17 and so forth is located downstream of the base container 14 containing the base mass 15. FIG. 1 only illustrates two product lines 16, 17 in detail. It is to be understood that each additional product line may be designed and arranged in a respective way. The number of product lines may be freely chosen. Up to six product lines are indicated herein. However, it is to be understood that it is also possible to use more product lines.

Each product line 16, 17 and so forth includes a product container 18 for mixing and supplying product mass 19. The product mass 19 is produced and kept ready from a respective portion of base mass 15 and of aggregates 23. For this purpose, a conduit 20 leads from the base container 14 into the product container 18. A valve 21 is arranged in the conduit 20. Aggregate containers 22 for aggregates 23 such as colours, flavours, and the like, are arranged parallel thereto. Only one aggregate container 22 is illustrated in each product line 16, 17 and so forth. However, it is to be understood that each product line 16, 17 and so forth may include a respective plurality of aggregate containers 22 for different aggregates. Each product line may include five or even more of such aggregate containers 22. The aggregate containers 22 include weighing cells 36. In other words, they are designed as weighing containers associated with additional containers for storage of the aggregates (not illustrated) which are located upstream of the aggregate containers 22. A conduit 24 including a valve 25 leads from each of the aggregate containers 22 to the product containers 18. This applies to each of the product lines 16, 17 and so forth. Thus, it is to be noticed that the product masses are mixed in the product containers 18 in batches by introducing a respective portion of base mass 15 and the associated aggregates 23 according to the recipe and by mixing them by the stirring apparatus 26. Mixing is realized in batches.

A conduit 27 including a valve 28 leads from the product container 18 to a reservoir container 29 holding reservoir mass 30. For example, the reservoir container 29 may be part of a pouring system which produces a certain product, for example red gummi bears (also called jelly babies). For example, the product line 17 produces green gummi bears.

The product lines 16, 17 and so forth preferably have identical designs, and they are arranged to be parallel. Thus, the design of the product lines 16, 17 and so on will be described with reference to product line 16 in the following.

The system 1 includes one common control unit 31 including a calculating unit 32. Electric lines 33 lead to each one of the product lines 16, 17 and so forth, the lines 33 branching to lines 34. Control blocks 46 located between the lines 33 and 34 may be associated with the product lines 16, 17 and so forth. Each reservoir container 29 includes a sensor 35 located therein. For example, the sensors 35 may be designed as adjustable level indicating sensors observing decrease of the volume of reservoir mass 30 contained in the reservoir container 29. When the adjusted predetermined minimum level of reservoir mass 30 contained in the reservoir container 29 is reached, the sensor 35 produces a signal. The signal is transmitted to the common control unit 31 via the respective lines 34, 33. The control unit 31 produces a signal for opening the respective valve 28 of the respective product line such that another batch of product mass 19 is transferred from the respective product container 18 into the reservoir container 29. The batch of product mass 19 has been mixed before. In this way, the level of reservoir mass 30 contained in the reservoir container 29 increases. It is to be understood that the reservoir mass 30 taken from the reservoir container 29 may be quasi continuously processed. For example, such quasi continuous processing is realized in a clocked manner by pouring the mass into respective forms in a pouring system.

Each product container 18 includes weighing cells 36 allowing for weighing of base mass 15 in the product container 18. Mixing of a further (following) batch of product mass 19 is realized in the respective product container 18 of the respective product line 16, 17 and so forth depending on the kind of mass to be produced. This process is realized by respective control of the valves 21 and 25 in the respective product line, for example in the product line 16. The base container 14 may also be controlled by the common control unit 31. However, for reasons of clarity of the drawings, this is not illustrated.

Figure 2:
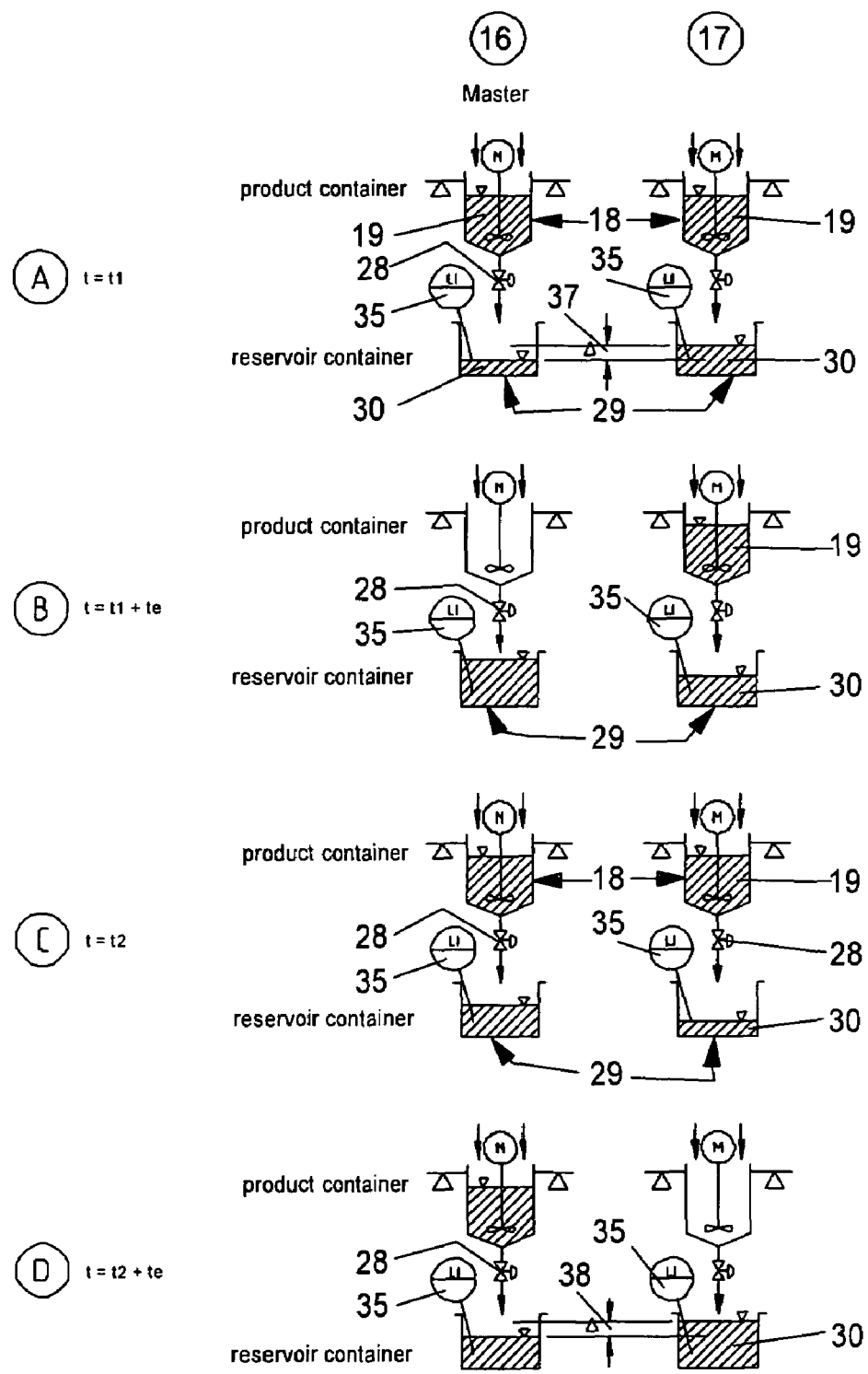
FIG. 2 is a view illustrating the process of filling two product containers in two parallel product lines in each of which a reservoir container is located downstream of the respective product container.
Figure 3:
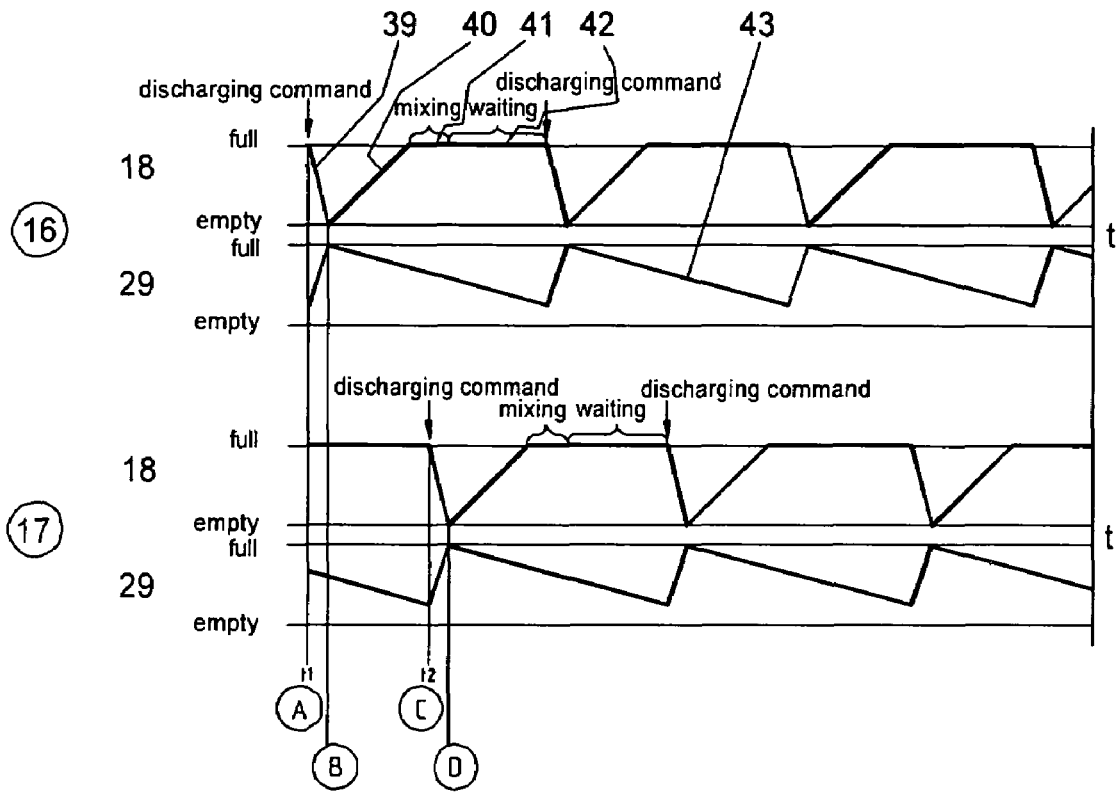
FIG. 3 is a diagram illustrating the course of the two product lines according to FIG. 2.

To emphasize the problems with which the present invention deals, it is especially referred to FIGS. 2 and 3. FIG. 2 illustrates a plurality of process steps relating to the product containers 18 and the reservoir containers 29 of the two product lines 16 and 17 being filled and discharged. Mixing of product mass 19 and refilling of reservoir mass 30 to become new product mass 19 are illustrated with reference to one batch of product mass 19.

Filling Condition "A"

At a point in time t=t1 representing the filling condition "A", the reservoir mass 30 contained in the reservoir container 29 of the product line 16 has been partly processed such that the liquid level of the reservoir mass 30 releases the sensor 35 (see the end of the line facing down from the circle designated with "35"). In this way, the respective signal for the common control unit 31 is produced. This signal causes transfer of a previously mixed batch of product mass 19 being delivered from the product container 18 into the reservoir container 29 of the product line 16. The reservoir mass 30 contained in the reservoir container 29 of the product line 17 still covers the sensor 35 such that the batch of product mass 19 remains located in the product container 18.

Filling Condition "B"

After the discharging time interval te, a point in time is reached (t=t1+te) which corresponds to the filling condition "B". The product container 18 of the product line 16 now is empty. The product mass 19 has filled up the reservoir container 29 of the product line 16 such that the level of reservoir mass 30 now contained in the reservoir container 29 has respectively increased. The level of reservoir mass 30 contained in the reservoir container 29 of the product line 17 has further decreased, but not to an extent to fall below the sensor 35.

Filling Condition "C"

The level in the product line 17 then falls below the sensor 35 at the filling condition C, i.e. at a period of time t=t2. During this time, reservoir mass 30 of all product lines 16, 17 is used such that the levels in the reservoir containers 29 of both product lines 16, 17 commonly sink. The time interval between the filling conditions "B" and "C" is sufficient to mix another batch of product mass 19 in the product container 18, as this is illustrated for the filling condition "C". As described before, the level of the reservoir mass 30 contained in the reservoir container 29 in the product line 17 reaches the predetermined minimum in the filling condition "C".

Filling Condition "D"

Thus, the reservoir container 29 in the product line 17 is now refilled until the filling condition "D" is reached at the point in time t=t2+te. This means that product mass 19 is introduced into the reservoir container 29. Simultaneously, the level in the reservoir container 29 of the product line 16 sinks, but without reaching the minimum as defined by the sensor 35.

There will be different filling level differences 37 (see filling condition "A") and 38 (see filling condition "D") in the reservoir containers 29 of the two product lines 16 and 17. Theoretically, the filling level differences 37 and 38 are zero if one assumes that the product lines 16, 17 and so forth of the system 1 have been started at the same time. Furthermore, it needs to be assumed that the consumption of the respective product lines 16 and 17 is exactly the same. Practically, such equal conditions cannot be maintained. There will always be different conditions concerning refilling of different product lines 16, 17 and so forth during the production of sweets and confectionery masses during longer periods of time. For example, different pouring parameters, slightly varying properties of the product masses 19 and of the reservoir masses 30 and slightly varying volumes of the pouring portions within the tolerance zones result in this variation.

FIG. 3 illustrates the chronological order of refilling taking place in the product lines 16 and 17 over a time axis t. The uppermost curve in FIG. 3 (see reference numerals 39, 40, 41, 42) indicates the filling condition of the product container 18 of the product line 16. When refilling of the reservoir container 29 is requested (and thus at the beginning of a discharge process of the product container 18), the valve 28 of the product container 18 is opened such that a batch of product mass 19 is discharged from the product container 18 into the reservoir container 29 due to gravity. The reservoir container 29 had only been filled up to its minimum level, and its level now increases. Refilling or re-feeding is coordinated in a way that the level of reservoir mass 30 contained in the reservoir container 29 does not fall below a minimum. In this way, constant product quality is realized.

Discharging of product mass 19 from the product container 18 is indicated in FIG. 3 by the decreasing line 39. The following increasing line 40 indicates filling of the product container 18 of the product line 16. During this period of time, a respectively controlled partial amount of base mass 15 including the different aggregates 23 is introduced into the product container 18. These introduced amounts are mixed during a period of time indicated by the horizontal line 41 ("mixing") such that one attains a batch of homogeneous product mass 19 in the product container 18. The line 41 is connected to another horizontal section in the form of a line 42. During this period of time indicated by line 42 ("waiting"), the batch of product mass 19 is maintained in the product container 18 until refilling of the reservoir container 29 is initiated.

This cycle is repeated in uniform intervals, while the batch size of the product mass 19 remains approximately constant.

The respective curve 43 indicates the course of the filling conditions of the reservoir mass 30 in the reservoir container 29 in the product line 16. It is to be seen that filling sections represented by increasing lines are connected to processing sections represented by decreasing lines. Each of the lines corresponds to respective refilling from the product container 18 and emptying of the reservoir container 29, respectively.

Respective conditions apply to the curves relating to the product line 17 which are illustrated in the bottom portion of FIG. 3. In this case, the association with FIG. 2 is indicated by relating to the filling conditions A, B, C and D as known from FIG. 2. It is to be seen that during the course of normal production, respective time-wise shifting of refilling occurs in the respective product line 16, 17 and so forth.

The problem which is especially addressed by the present invention occurs at the ending of a production process. The ending of a production process is to be understood as to also include the production process being interrupted or the recipe being changed, meaning when a different product is to be produced. Then, one has to make a decision on how to terminate production. Such a production ending may be entered by an input device of the common control unit 31, and it will lead to the reservoir containers 29 of the respective product lines 16, 17 and so forth being refilled as long as mass is still available. The containers will be discharged in different ways, while the ending of production taking place in the respective product lines 16, 17 and so forth occurs at different points in time. It is desired to prevent such an effect and to instead control the system 1 such that all product lines operate until one common ending has been reached. This means that the mixing conditions of the different kinds of products are maintained until this common end point has been reached without substantial waste masses being produced. This novel process is further explained with reference to the following drawings.

Figure 4:
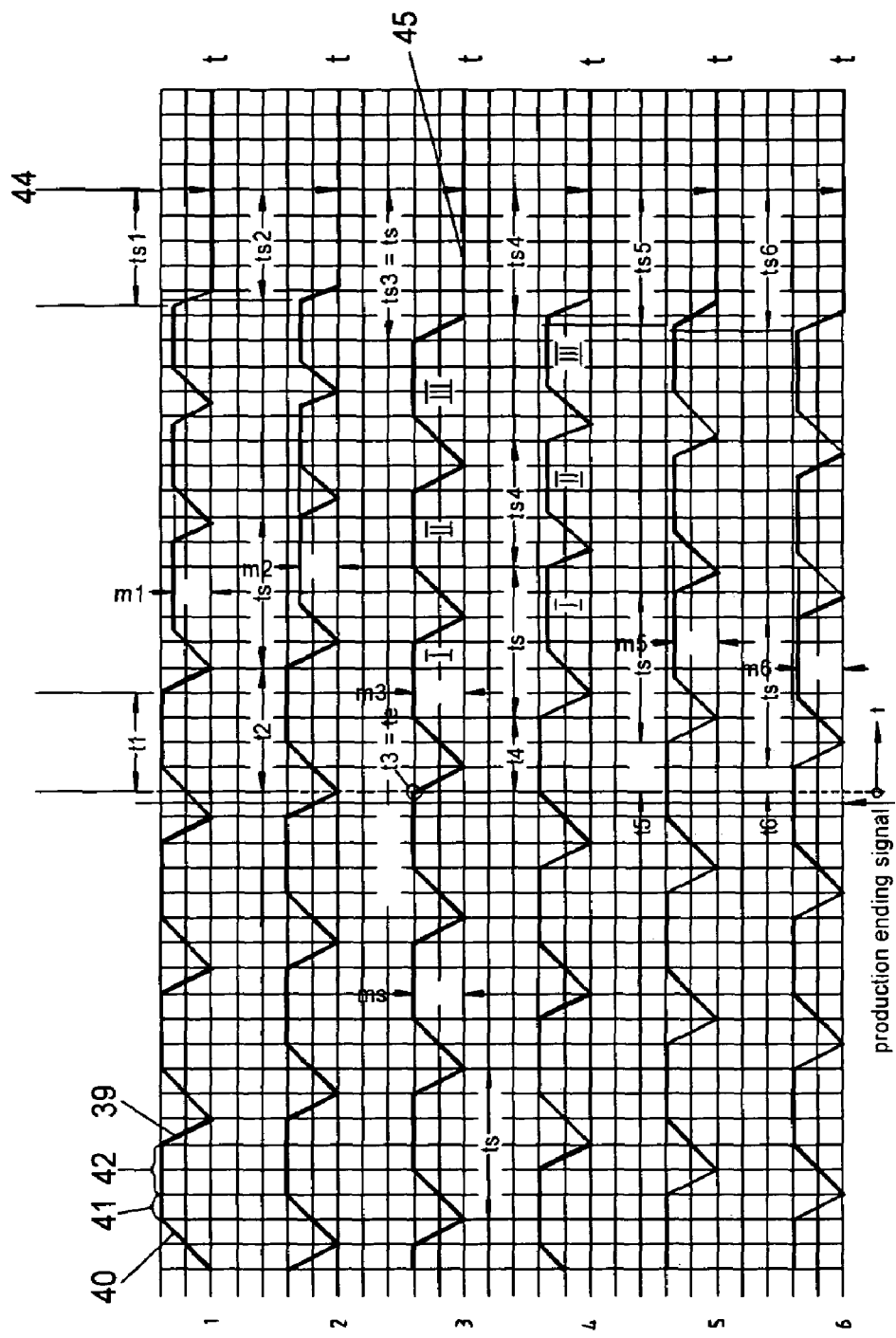
FIG. 4 is a diagram illustrating six product lines in which batch sizes and batch times are adapted by batch decrease.

FIG. 4 is a time-dependency diagram illustrating the course of the product mass 19 in the product containers 18. Six product lines of a system 1 are indicated by the six curves being located one above the other. Each curve has a design which is somewhat similar to the uppermost curve as illustrated in FIG. 3, at least at the beginning. Generally, all curves have similar designs, and they include straight sections which are repeated in batches. For example, the uppermost curve of the product line 1 begins with a line 40 indicating the process of filling the product container 18 with base mass 15 and aggregates 23. Next, there is a horizontal section including the lines 41 and 42. The line 41 indicates mixing of the base mass 15 with the aggregates 23. The line 42 indicates waiting which lasts until a sensor 35 located in the associated reservoir container 29 causes a refill. The product container 18 is then discharged in accordance with line 39. In this way, processing of one batch of product mass 19 in the product container 18 has been described. The illustration of the curve of the product line 1 shows three of such batches as they follow one after the other. Similar applies to the course of the product masse 19 in the other product containers 18, meaning the product containers 18 of the product lines 2, 3, 4, 5 and 6. The course of the curves is shown over a time axis, and it is to be noticed how the order of the respective batches in the product lines have been shifted with respect to one another. The batch size of all product masses is approximately constant, and it corresponds to the constructively predetermined batch size which is especially determined by the volume of the product container 18. The batch times in all product lines are also approximately constant. The point of transition between the lines 42 and 39 symbolizes the occurrence of the respective signal for discharge of the respective product container 18. At the same time, this means a refill of the reservoir container 29.

At a certain point in time, a signal serving to cause production ending is set. The signal may be freely created by inputting it into the common control unit 31, or it may be determined by other processing parameters, for example by a discharge of a container located upstream. After setting of the signal for the intended production ending, it is first determined which product container 18 of the different product lines 1 to 6 is the next one that requires refilling. Practically, this can be determined in FIG. 4 by measuring the horizontal distance between the production ending signal and the last foregoing start of a refill, i.e. the point connecting lines 42 and 39. In case of the product lines 1 to 6 illustrated in FIG. 4, this is the container 18 in the product line 3. Thus, the product line 3 becomes the guiding product line or the master product line. In the illustrated example, it is operated for three more full working cycles (c=3) at a constant batch size and a constant batch time. This is continued until the actual product ending 44. The horizontal curve section 45 before the actual product ending 44 of the product line 3 indicates the constructively predetermined batch time, meaning the time interval which is required for processing the reservoir mass 28 contained in the reservoir container 29 of the product line 3 until it has been completely discharged. The constructively maintained batch sizes and batch times in the product line 3 are indicated by the lines 41 and 42 still having the same height as before. The point in time when the first refill of the product line 3 from the product container 18 into the reservoir container 29 has been requested is stored as te=t3 in the common control unit 31.

In the following, it is determined which is the next product line (following product line 3) which desires a refill. As this is to be seen in FIG. 4 (see the distance from the vertical line indicating the production ending signal and the beginning of the decreasing line 39), this is production line 6. The point in time when a refill takes place in product line 6 is determined, and the time difference t6 between the points in time of refilling the product lines 6 and 3 is determined, respectively. It is possible to calculate the reduced batch size of the product line 6 and the reduced batch time by using the equation for batch reduction mentioned in the summary portion of the specification. It is to be understood that a batch of a smaller batch size may be processed in a shorter period of time. As it is to be seen in FIG. 4, c=3 has been chosen for the following cycles. This means that the required reduction of the batch size is distributed over three cycles. The batch time is respectively reduced. The distribution is realized such that the reservoir mass 30 in the associated reservoir container 29 of the product line 6 reaches the production ending 44 at the same time as the production line 3 reaches its production ending. The production ending 44 is reached by simultaneously occurring signals of all sensors 35 requesting a refill. However, refilling is not conducted. The reduced batch sizes are indicated by decreased heights of the curves in FIG. 4.

Respective conditions apply to the other product lines requiring refilling in product line 5, product line 4, product line 1 and finally product line 2. In this way, all product lines 1, 2, 3, 4, 5, 6 reach the actual product ending 44 at the same time without remainders of mass remaining in the six reservoir containers 29.

Figure 5:
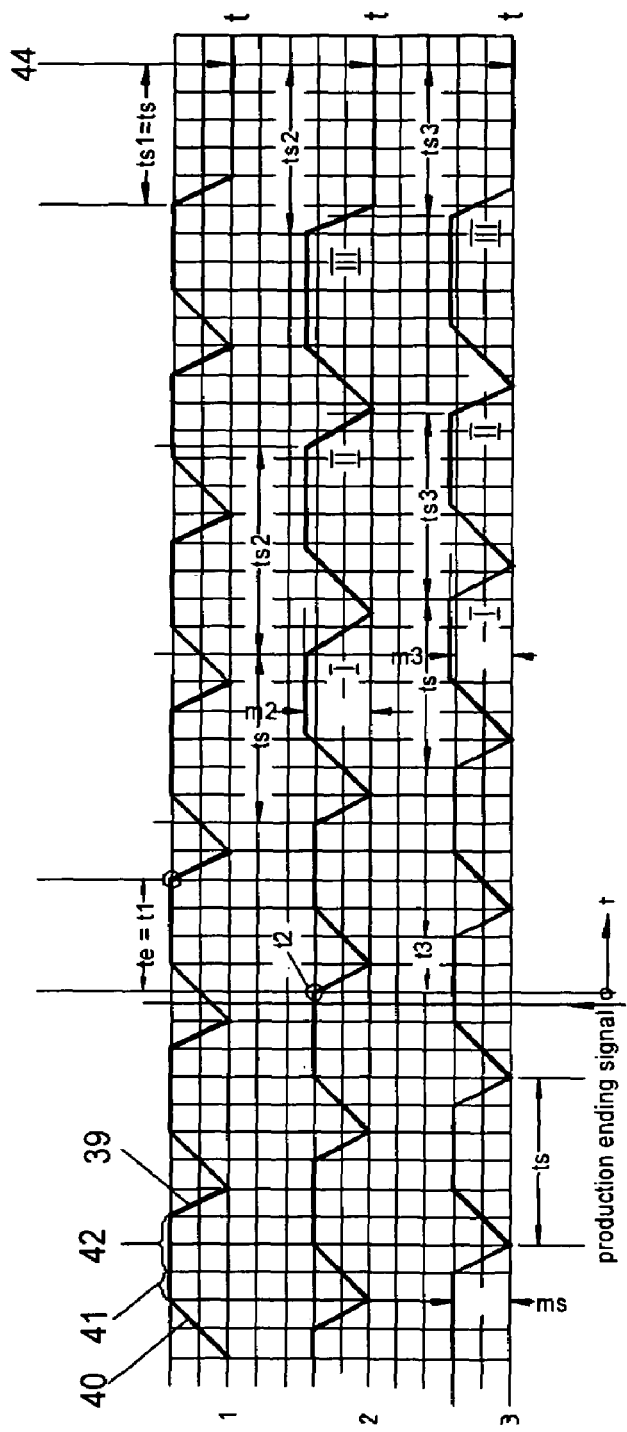
FIG. 5 is a diagram illustrating the product containers of three product lines in which batch sizes and batch times are adapted by batch increase.

FIG. 5 illustrates another possibility of reaching a common production ending 44. In this case, this is realized by a batch increase. For reasons of simplicity of the drawings, only three product lines 1, 2, 3 are illustrated in FIG. 5. Generally, it is referred to the above description of FIG. 4. In FIG. 5, the points in time when refilling takes place in the respective product lines 1, 2, 3 are observed and recorded after introduction of a signal for a desired production ending. However, in case of the exemplary embodiment illustrated in FIG. 5, the latest refilling signal is used as the guiding signal or master signal (tl=t1). As it is to be seen in FIG. 5, in this case it is the production line 1 which is the last one to require refilling after the production ending signal. The difference to the point in time of refilling of product line 2 determines the batch increase in the product line 2. The batch increase in the product line 2 is the greatest since it is the product line 2 in which the greatest time interval between the refilling signals occurs. The respective process occurring in product line 3 is located approximately therebetween. When increasing the batch sizes and batch times in the product lines 2 and 3, the product line 1 as the guiding line still is operated in a constant way. Again, c=3 is chosen, meaning the actual production ending 44 is to be reached after three corrected batch sizes.

Generally, there is the possibility of using more or less than three corrected batch sizes in each production line. For example, only one corrected batch size may be used in each production line (c=1). However, this results in the drawback of comparatively great differences between the different batch sizes and batch times in the respective product lines occurring. Such great differences may have a negative effect with respect to maintaining usual product properties. When it is desired to keep the difference between the corrected batch size and the constructive batch size as low as possible, one will chose c>1. The masses of the corrected batch sizes also need to be respectively mixed while the constructively predetermined container size has to be used. Especially with respect to a batch increase (FIG. 5), this is to be taken into account.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of controlling a system for simultaneously producing a plurality of different product kinds of confectioneries in a plurality of product lines, said method comprising the steps of:
dividing a base mass into a plurality of partial masses, the base mass being a common mass for all product kinds and all product lines;
mixing the partial masses with different aggregates to produce a plurality of different product masses, the aggregates varying depending on the respective product kind;
further processing the product masses as reservoir masses;
observing the consumption of the reservoir masses during further processing;
refilling the reservoir masses with the respective product mass in response to the result of the observation of the consumption of the reservoir masses, wherein
refilling takes place in each of the product lines in batches of product mass,
refilling takes place in the product lines at different points in time, and
the batches of product masses have approximately identical batch sizes, the batch size of a product masses being the amount of the product mass; and
following to a production ending signal, changing the batch sizes and batch times of at least one product mass in a way that the reservoir masses of all product lines are exhausted at the same time.

2. The method of claim 1, wherein the steps of mixing, further processing, observing and refilling are conducted for a plurality of times in cycles before the step of changing.

3. The method of claim 2, further comprising the step of:
determining a first product mass of the plurality of product masses,
the first product mass having a first batch size and a first batch time before the production ending signal,
the first product mass having a second batch size and a second batch time after the production ending signal,
the first and second batch sizes being approximately identical, and the first and second batch times being approximately identical,
determining the remaining product masses as all product masses with the exception of the first product mass,
the remaining product masses each having a first batch size and a first batch time before the production ending signal,
the remaining product masses each having a second batch size and a second batch time after the production ending signal,
the first and second batch sizes of the remaining product masses not being identical, and the first and second batch times of the remaining product masses not being identical, the second batch sizes and the seond batch times being changed such that the reservoir masses of all product lines are exhausted at the same time.

4. The method of claim 3, further comprising the steps of:
determining the time differences between two steps of refilling of two cycles for each product line; and
changing the second batch sizes and second batch times of the remaining product masses in response to the result of the step of determining such that the time differences between two steps of refilling of two cycles simultaneously disappear for all product lines.

5. The method of claim 4, wherein the steps of mixing, further processing, observing and refilling are conducted for a plurality of times in cycles after the step of changing, the step of changing being realized for each of the remaining product lines in a way that the respective product mass has a plurality of approximately identical second batch sizes.

6. The method of claim 5, wherein the second batch sizes of the remaining product masses are changed to be smaller than the first batch sizes of the remaining product masses, the reduced second batch size of each product mass being proportional to the time difference between the point in time of refilling with the respective remaining product mass and refilling with the first product mass.

7. The method of claim 6, wherein the second batch sizes of the remaining product masses are changed according to the following equation $$mn = ms - (tn/(ts \cdot c)) \cdot ms$$

wherein the following applies:
ms [kg]=predetermined first batch size of all product masses,
mn [kg]=reduced second batch size of the remaining product masses,
n=product lines (n=1, 2, 3, 4 and so forth),
tn=time difference between refilling with the product masses,
te=0=point in time of refilling with the first product mass,
ts=predetermined batch time all product masses,
c=number of cycles until the production ending.

8. The method of claim 5, wherein the second batch sizes of the remaining product masses are changed to be greater than the first batch sizes of the remaining product masses, the increased second batch size of each product mass being proportional to the time difference between the point in time of refilling with the respective remaining product mass and refilling with a last product mass.

9. The method of claim 8, wherein the second batch sizes of the remaining product masses are changed according to the following equation $$mn = ms + ((tl - tn)/(ts \cdot c)) \cdot ms$$

wherein the following applies:
ms [kg]=predetermined first batch size of all product masses,
mn [kg]=increased second batch size of the remaining product masses,
n=the product lines (n=1, 2, 3, 4 and so forth),
tn=time difference between refilling with the product masses,
tl=time difference between refilling with the last product mass and the first product mass,
ts=predetermined batch time all product masses,
c=number of cycles until the production ending.

10. The method of claim 1, further comprising the step of:
determining a first product mass of the plurality of product masses,
the first product mass having a first batch size and a first batch time before the production ending signal, the first product mass having a second batch size and a second batch time after the production ending signal, the first and second batch sizes being approximately identical, and the first and second batch times being approximately identical, determining the remaining product masses as all product masses with the exception of the first product mass, the remaining product masses each having a first batch size and a first batch time before the production ending signal, the remaining product masses each having a second batch size and a second batch time after the production ending signal, the first and second batch sizes of the remaining product masses not being identical, and the first and second batch times of the remaining product masses not being identical, the second batch sizes and the seond batch times being changed such that the reservoir masses of all product lines are exhausted at the same time.

11. An apparatus for simultaneously producing a plurality of different product kinds of confectioneries in a plurality of product lines, comprising:

a base container, said base container being designed and arranged to contain a common base mass for all product kinds;

a plurality of product containers, each of said product containers being associated with one of the product kinds, said product containers being designed and arranged to produce batches of different product masses in the product lines;

a plurality of aggregate containers, each of said aggregate containers being designed and arranged to contain aggregates associated with one of the product lines;

a plurality of reservoir containers, each of said reservoir containers being designed and arranged to contain a reservoir mass associated with one of the product lines, each of said reservoir containers being designed and arranged to allow for further processing of the respective reservoir mass, each of said reservoir containers including a sensor, said sensor being designed and arranged to sense a change of the amount of reservoir mass contained in said reservoir container and to produce a signal which is proportional to the change of the amount of reservoir mass contained in said reservoir container; and a common control unit, said common control unit including a processor, said common control unit being designed and arranged to receive the signals of said sensors and to determine and control a modified batch size and batch time of at least one product mass in a way that the reservoir masses of all product lines are exhausted at the same time.

12. The apparatus of claim 11, further comprising a plurality of conduits and valves, said conduits being designed and arranged to connect said containers, said valves being arranged in said conduits, said base container, said product containers and said aggregate containers including weighing cells, said common control unit being designed and arranged to control said valves and said weighing cells in a way that the reservoir masses of all product lines are exhausted at the same time.

13. The apparatus of claim 12, wherein said weighing cells of said product containers and said aggregate containers are designed and arranged to determine the mixture of a batch of product mass, said weighing cells being connected to said common control unit.

14. The apparatus of claim 11, wherein said common control unit includes a plurality of control blocks each being associated with one the product lines.

* * * * *